(12) United States Patent
Tao et al.

(10) Patent No.: US 12,162,036 B2
(45) Date of Patent: Dec. 10, 2024

(54) ACOUSTIC TRANSDUCER UNIT, METHOD FOR MANUFACTURING THE SAME, AND ACOUSTIC TRANSDUCER

(71) Applicant: BOE TECHNOLOGY GROUP CO., LTD., Beijing (CN)

(72) Inventors: Yongchun Tao, Beijing (CN); Shuai Hou, Beijing (CN); Jingwen Guo, Beijing (CN); Hui Hua, Beijing (CN); Xiaotong Liu, Beijing (CN); Yichi Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 402 days.

(21) Appl. No.: 17/772,263

(22) PCT Filed: May 20, 2021

(86) PCT No.: PCT/CN2021/094848
§ 371 (c)(1),
(2) Date: Apr. 27, 2022

(87) PCT Pub. No.: WO2022/001461
PCT Pub. Date: Jan. 6, 2022

(65) Prior Publication Data
US 2022/0379345 A1    Dec. 1, 2022

(30) Foreign Application Priority Data

Jun. 29, 2020    (CN) .......................... 202010605270.0

(51) Int. Cl.
*B06B 1/02*    (2006.01)
*H04R 19/00*    (2006.01)
*G01N 29/34*    (2006.01)

(52) U.S. Cl.
CPC .......... *B06B 1/0292* (2013.01); *H04R 19/005* (2013.01); *B06B 2201/51* (2013.01); *G01N 29/34* (2013.01)

(58) Field of Classification Search
CPC . H04R 19/005; B06B 1/0292; B06B 2201/51; B06B 1/0622; B06B 1/0607; G01N 29/34
See application file for complete search history.

(56) References Cited

U.S. PATENT DOCUMENTS

| | | | |
|---|---|---|---|
| 10,427,188 | B2 | 10/2019 | Oralkan et al. |
| 2002/0007118 | A1 | 1/2002 | Adachi et al. |

(Continued)

FOREIGN PATENT DOCUMENTS

| | | |
|---|---|---|
| CN | 1899951 A | 1/2007 |
| CN | 205199868 U | 5/2016 |

(Continued)

OTHER PUBLICATIONS

China Patent Office, First Office Action dated Jan. 29, 2022, for corresponding Chinese application 202010605270.0.

(Continued)

*Primary Examiner* — Tuan D Nguyen
(74) *Attorney, Agent, or Firm* — HOUTTEMAN LAW LLC (57) ABSTRACT

The present disclosure provides an acoustic transducer unit and a manufacturing method thereof, and an acoustic transducer, the acoustic transducer unit includes: a base substrate; a first electrode on the base substrate; a support pattern on a side of the first electrode away from the base substrate, which is enclosed into an accommodation groove, at least one release groove and at least one connection groove, an orthographic projection of the release groove on the base substrate is spaced apart from that of the accommodation groove on the base substrate, the connection groove is (Continued)

between the accommodation groove and the release groove to communicate them; a diaphragm pattern on the side of the first electrode away from the base substrate and capable of vibrating in the accommodation groove; a filling pattern in the release groove; a second electrode on a side of the diaphragm pattern away from the base substrate.

20 Claims, 9 Drawing Sheets

(56) References Cited

U.S. PATENT DOCUMENTS

| | | | |
|---|---|---|---|
| 2006/0284183 | A1 | 12/2006 | Izumi et al. |
| 2011/0305822 | A1* | 12/2011 | Hasegawa ............. B06B 1/0292 |
| | | | 205/668 |
| 2014/0236018 | A1 | 8/2014 | Matsumoto et al. |
| 2015/0001987 | A1 | 1/2015 | Masaki et al. |
| 2016/0153939 | A1* | 6/2016 | Kato ..................... B06B 1/0292 |
| | | | 73/606 |
| 2018/0221917 | A1 | 8/2018 | Maruyama et al. |
| 2018/0243792 | A1 | 8/2018 | Rothberg et al. |
| 2019/0366382 | A1 | 12/2019 | Akiyama |

FOREIGN PATENT DOCUMENTS

| | | |
|---|---|---|
| CN | 105657626 A | 6/2016 |
| CN | 109561876 A | 4/2019 |
| CN | 110008929 A | 7/2019 |
| CN | 110350885 A | 10/2019 |
| CN | 110995196 A | 4/2020 |
| EP | 1781067 A1 | 5/2007 |
| JP | 2001258879 A | 9/2001 |
| JP | 2018110611 A | 7/2018 |
| JP | 2018129725 A | 8/2018 |
| JP | 2019212992 A | 12/2019 |
| TW | 201834025 A | 9/2018 |

OTHER PUBLICATIONS

Wang, Chaojie, "Design of Capacitive Micromachined Ultrasonic Transducer and Research on Encapsulation Technology," Master's Thesis, May 25, 2017, North University of China, Taiyuan, China.

* cited by examiner

ACOUSTIC TRANSDUCER UNIT, METHOD FOR MANUFACTURING THE SAME, AND ACOUSTIC TRANSDUCER

TECHNICAL FIELD

The present disclosure relates to an acoustic transducer unit, a method for manufacturing the same, and an acoustic transducer.

BACKGROUND

Ultrasonic detection has wide applications in medical imaging, therapy, industrial flowmeters, automotive radars, indoor positioning, and other aspects. An acoustic transducer is a device that can be used in ultrasonic detection, in which the core component is an acoustic transducer unit. Vibration performance of a diaphragm pattern in the acoustic transducer unit will directly affect performance of the acoustic transducer unit.

SUMMARY

To solve at least one of the problems in the related art, the present disclosure provides an acoustic transducer unit, a method for manufacturing the same, and an acoustic transducer.

In a first aspect, an embodiment of the present disclosure provides an acoustic transducer unit, including:
 a base substrate;
 a first electrode on a side of the base substrate;
 a support pattern on a side of the first electrode away from the base substrate, wherein the support pattern is enclosed into an accommodation groove, at least one release groove and at least one connection groove, an orthographic projection of the release groove on the base substrate is spaced apart from an orthographic projection of the accommodation groove on the base substrate, and the connection groove is located between the accommodation groove and the release groove to communicate the accommodation groove with the release groove;
 a diaphragm pattern on the side of the first electrode away from the base substrate and capable of vibrating in the accommodation groove;
 a filling pattern filled in the release groove; and
 a second electrode on a side of the diaphragm pattern away from the base substrate.

In some implementations, an orthographic projection of the diaphragm pattern on the base substrate completely covers the orthographic projection of the accommodation groove on the base substrate.

In some implementations, one release groove corresponds to at least one connection groove.

In some implementations, a plurality of release grooves are provided, and a plurality of connection grooves in one-to-one correspondence with the release grooves are provided.

In some implementations, the plurality of release grooves are uniformly distributed outside the accommodation groove.

In some implementations, a cross section of the accommodation groove parallel to the base substrate has a quadrilateral shape, a hexagonal shape, an octagonal shape, a dodecagonal shape or a circular shape.

In some implementations, the diaphragm pattern extends to the connection groove, and an orthographic projection of the diaphragm pattern on the base substrate completely covers an orthographic projection of the connection groove on the base substrate.

In some implementations, an orthographic projection of the filling pattern on the base substrate completely covers the orthographic projection of the release groove on the base substrate; and
 an area of the orthographic projection of the filling pattern on the base substrate is greater than an area of the orthographic projection of the release groove on the base substrate.

In some implementations, the support pattern and the diaphragm pattern are made of a same material.

In some implementations, the acoustic transducer unit further includes:
 an etching barrier layer between the base substrate and the support pattern.

In some implementations, the acoustic transducer unit further includes:
 a passivation layer on a side of the diaphragm pattern away from the base substrate, where an orthographic projection of the passivation layer on the base substrate does not overlap the orthographic projection of the accommodation groove on the base substrate.

In a second aspect, an embodiment of the present disclosure provides an acoustic transducer, including: a base and a plurality of acoustic transducer elements on the base substrate, where each acoustic transducer element includes at least one acoustic transducer unit as described in the first aspect.

In some implementations, each acoustic transducer element includes a plurality of acoustic transducer units; and
 in a same acoustic transducer element, at least two acoustic transducer units adjacent to each other are in communication with a same release groove through different connection grooves.

In some implementations, each acoustic transducer element includes a plurality of acoustic transducer units; and
 first electrodes of the plurality of acoustic transducer units in a same acoustic transducer element are electrically connected, and second electrodes of the plurality of acoustic transducer units in a same acoustic transducer element are electrically connected; and
 second electrodes of acoustic transducer units in different acoustic transducer elements are mutually electrically insulated.

In some implementations, first electrodes of the plurality of acoustic transducer units in a same acoustic transducer element form a plate electrode being a one-piece structure.

In some implementations, second electrodes of the plurality of acoustic transducer units in a same acoustic transducer element are electrically connected through a signal trace; and
 the signal trace and the second electrodes are made of a same material.

In a third aspect, an embodiment of the present disclosure provides a method for manufacturing an acoustic transducer unit as described in the first aspect, including:
 forming the first electrode on the base substrate;
 forming a sacrificial pattern on the side of the first electrode away from the base substrate, wherein the sacrificial pattern is located in regions of the accommodation groove, the release groove and the connection groove to be formed subsequently;
 forming the support pattern and the diaphragm pattern on the side of the first electrode away from the base substrate, where a part of the support pattern on a side surface of the sacrificial pattern is enclosed into the accommodation groove, the release groove and the connection groove, the orthographic projection of the release groove on the base substrate is spaced apart from the orthographic projection of the accommodation groove on the base substrate, and the diaphragm pattern is located on the side of the first electrode away from the base substrate, and a release hole is formed in the diaphragm pattern in a region where the release groove is located;

removing the sacrificial pattern through the release hole;

forming a filling pattern in the release groove and the release hole; and forming a second electrode on the side of the diaphragm pattern away from the base substrate.

DETAIL DESCRIPTION OF EMBODIMENTS

To improve understanding of the technical solution of the present disclosure for those skilled in the art, the acoustic transducer unit, the method for manufacturing the same, and the acoustic transducer provided in the present disclosure will be described below in detail in conjunction with the accompanying drawings.

In the related art, a process of manufacturing a diaphragm in an acoustic transducer unit includes: firstly forming a support pattern and a diaphragm pattern, where the support pattern is enclosed into an accommodation groove filled with a sacrificial pattern, and the diaphragm pattern covers a part of a region of the accommodation groove to expose a part of the sacrificial pattern in the accommodation groove, namely, a release hole is formed in the diaphragm pattern in the region of the accommodation groove; then, etching a part (at a position corresponding to the release hole) of the sacrificial pattern located in the accommodation groove and exposed from the diaphragm pattern by wet etching, and etching a part of the sacrificial pattern located in the accommodation groove but not exposed from the diaphragm pattern, to completely remove the sacrificial pattern; and finally, forming a filling pattern in a region in the accommodation groove but not covered by the diaphragm pattern to seal the release hole.

In the related art, since the release hole is located in the region where the accommodation groove is located and finally needs to be filled with the filling pattern, a vibratile part of the diaphragm pattern in the accommodation groove has a smaller size than a top opening of the accommodation groove. In the actual production and manufacturing process, if a size of the release hole is too small, more time will be needed to remove the sacrificial pattern, leading to a longer overall manufacturing period of the acoustic transducer unit; and if the size of the release hole is too large or too many release holes are provided, the vibratile part of the diaphragm pattern in the accommodation groove will have a smaller size, vibration performance of the diaphragm pattern may become worse (an amplitude thereof being reduced), and the filling pattern may have a greater influence on the diaphragm pattern, thereby leading to degradation of overall performance of the acoustic transducer unit. It is hard to find a balance between the manufacturing period and the overall performance of the acoustic transducer unit.

In order to solve the above technical problems in the related art, embodiments of the present disclosure provide an acoustic transducer unit, a method for manufacturing the same, and an acoustic transducer.

Figure 1A:
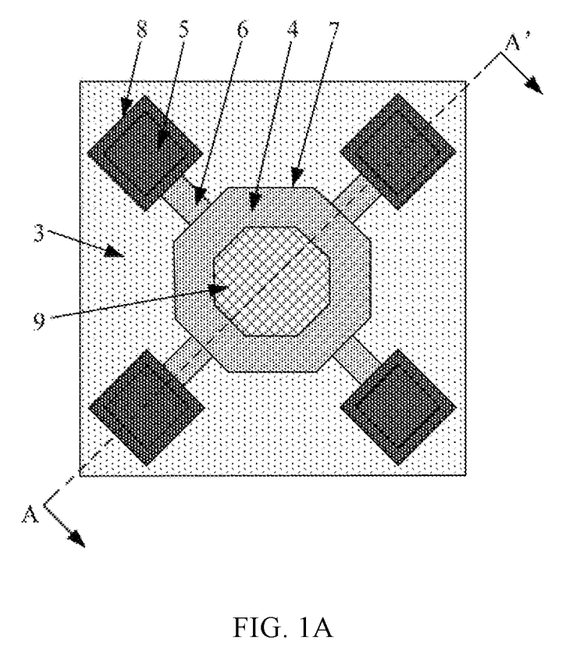
FIG. 1A is a top view of an acoustic transducer unit provided in an embodiment of the present disclosure.
Figure 1B:
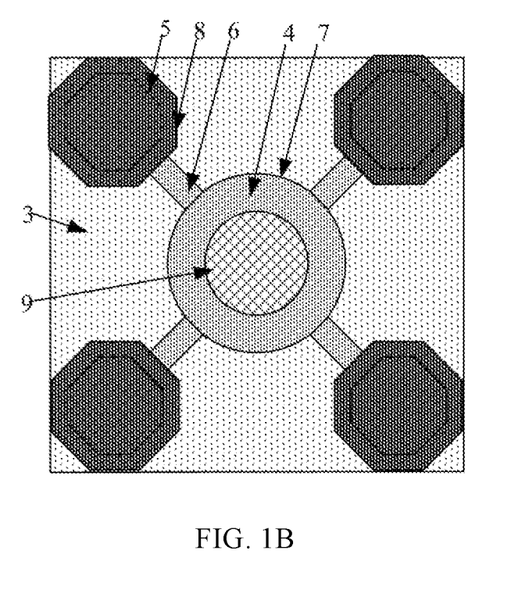
FIG. 1B is a top view of another acoustic transducer unit provided in an embodiment of the present disclosure.
Figure 2:
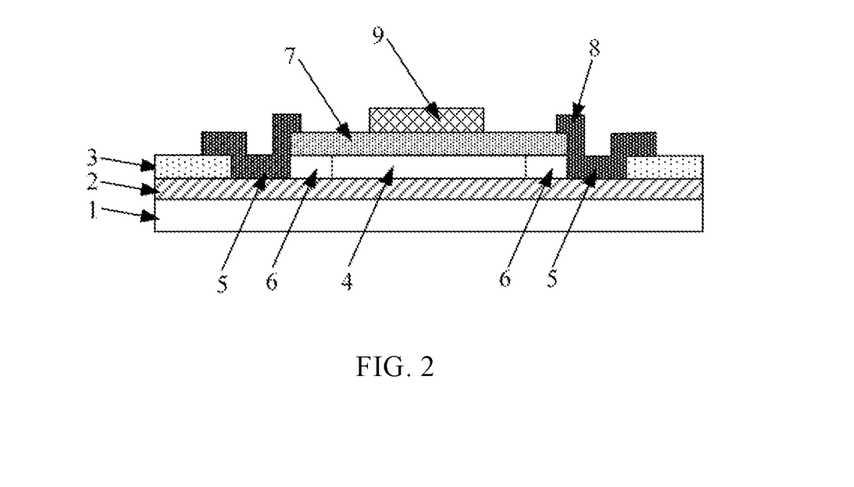
FIG. 2 is a schematic cross-sectional view taken along line A-A' of FIG. 1A.

FIG. 1A is a top view of an acoustic transducer unit provided in an embodiment of the present disclosure, FIG. 1B is a top view of another acoustic transducer unit provided in an embodiment of the present disclosure, and FIG. 2 is a schematic cross-sectional view taken along line A-A' of FIG. 1A. As shown in FIGS. 1A, 1B and 2, the acoustic transducer unit includes: a base substrate 1, a first electrode 2, a support pattern 3, a diaphragm pattern 7, a filling pattern 8 and a second electrodes 9.

The first electrode 2 is located on a side of the base substrate 1. The support pattern 3 is located on a side of the first electrode 2 away from the base substrate 1, and the support pattern 3 is enclosed into an accommodation groove 4, at least one release groove 5 and at least one connection groove 6. The diaphragm pattern 7 is located on the side of the first electrode 2 away from the base substrate 1, and capable of vibrating in the accommodation groove 4. The filling pattern 8 is filled in the release groove 5. The second electrode 9 is on a side of the diaphragm pattern away from the base substrate 1.

An orthographic projection of the release groove 5 on the base substrate 1 is spaced apart from an orthographic projection of the accommodation groove 6 on the base substrate 1, and the connection groove 6 is located between the accommodation groove 4 and the release groove 5 to communicate the accommodation groove 4 with the release groove 5. In other words, the release groove 5 for removing the sacrificial pattern in the accommodation groove 4 is disposed outside a region where the accommodation groove 4 is located, and meanwhile, the filling pattern 8 filling the release groove 5 is also located outside the accommodation groove 4, so that the filling pattern 8 does not occupy space in the accommodation groove 4. As a result, the accommodation groove 4 can be completely covered by the diaphragm pattern 7, the influence of the filling pattern 8 on vibration of the diaphragm pattern 7 is relative small, and the diaphragm pattern 7 has a good vibration performance.

In some implementations, an orthographic projection of the diaphragm pattern 7 on the base substrate 1 completely covers the orthographic projection of the accommodation groove 4 on the base substrate 1. That is, it is achieved that the diaphragm pattern 7 completely covers the accommodation groove to obtain a better vibration performance.

Meanwhile, the release groove 5 is located outside the accommodation groove 4, which enables the release groove 5 to be correspondingly increased in size and number. Therefore, less time is spent in removing the sacrificial pattern, which facilitates to reduce the overall manufacturing period of the acoustic transducer unit.

Referring to FIGS. 1A, 1B and 2, an orthographic projection of the filling pattern 8 on the base substrate 1 completely covers the orthographic projection of the release groove 5 on the base substrate 1, and an area of the orthographic projection of the filling pattern 8 on the base substrate 1 is greater than an area of the orthographic projection of the release groove 5 on the base substrate 1. In such case, the filling pattern 8 can seal the release groove 5 well.

When the acoustic transducer unit provided in the embodiments of the present disclosure is used for ultrasonic detection, the acoustic transducer unit is firstly in a transmitting state and then is switched to a receiving state.

When the acoustic transducer unit is in the transmitting state, a forward direct current bias voltage VDC is applied between the second electrode 9 and the first electrode 2, and the diaphragm pattern 7 is bent and deformed downward (a side close to the first electrode 2) under an electrostatic action. On this basis, an alternating voltage VAC with a certain frequency f (a magnitude of f is set according to actual needs) is applied between the second electrode 9 and the first electrode 2 to excite the diaphragm pattern 7 to reciprocate greatly (in a direction toward the first electrode 2 and a direction away from the first electrode 2), so that the conversion of electric energy to mechanical energy is realized, and the diaphragm pattern 7 radiates energy to a medium environment to generate an ultrasonic wave. A part of the ultrasonic wave may be reflected on a surface of an object to be measured, and returned to the acoustic transducer unit to be received and detected by the acoustic transducer unit 13.

When the acoustic transducer unit is in the receiving state, only a direct current bias voltage is applied between the second electrode 9 and the first electrode 2, and the diaphragm pattern 7 achieves static balance under actions of an electrostatic force and a film restoring force. When an ultrasonic wave act on the diaphragm pattern 7, the diaphragm pattern 7 is excited to vibrate, and a space in a cavity between the second electrode 9 and the first electrode 2 is changed, causing changes in capacitance between plates and generating a detectable electric signal based on which detection of the received ultrasonic wave is implemented.

In some implementations, one release groove 5 corresponds to at least one connection groove 6. In other words, one release groove 5 may be connected to one or two or more connection grooves 6, which will be explained in detail below with reference to the accompanying drawings.

Referring to FIGS. 1A and 1B, in some implementations, a plurality of release grooves are provided, and a plurality of connection grooves in one-to-one correspondence with the release grooves are provided. Regardless of sizes of the release groove 5 and the connection groove 6, the more release grooves 5 are provided, the shorter time is spent in removing the sacrificial pattern. Apparently, in the case where the number of the release grooves 5 is increased, a size of the acoustic transducer unit is increased accordingly.

In some implementations, the plurality of release grooves 5 are uniformly distributed outside the accommodation groove 4, which effectively ensures that a size of the sacrificial pattern is uniformly reduced during the process of removing the sacrificial pattern. In some implementations, for any one of the release grooves 5, a distance between the release groove 5 and another release groove 5 closest thereto is a preset fixed value, so as to realize an overall uniform distribution of the plurality of release grooves 5. At the same time, centers of the release grooves 5 are equidistant from a center of the accommodation groove 4, so that the plurality of release grooves 5 are uniformly distributed around the accommodation groove 4 in a regular polygon shape (for example, the release grooves 5 are distributed in a regular polygon shape, and the center of the accommodation groove 4 is the center of the regular polygon).

It should be noted that FIG. 1A only exemplarily shows four release grooves 5 located in an upper left region, a lower left region, an upper right region, and a lower right region with respect to the accommodation groove 4 respectively and arranged in a square shape, FIG. 1B only exemplarily shows four release grooves 5 located at an upper left side, a lower left side, an upper right side, and a lower right side of the accommodation groove 4 respectively and arranged in a square shape, and the cases shown in FIGS. 1A and 1B are merely exemplary and do not limit the technical solutions of the present disclosure.

In some implementations, a cross section of the accommodation groove 4 parallel to the base substrate 1 has a quadrilateral shape, a hexagonal shape, an octagonal shape (FIG. 1A), a dodecagonal shape or a circular shape (FIG. 1B, which may be a roughly circular shape). In some implementations, a cross section of the release groove 5 parallel to the base substrate 1 has a quadrilateral shape (FIG. 1A), a hexagonal shape, an octagonal shape (FIG. 1B), a dodecagonal shape or a circular shape (which may be a roughly circular shape).

It should be noted that the shapes of the accommodation groove 4 and the release groove 5 shown in FIGS. 1A and 1B are merely exemplary, and do not limit the technical solutions of the present disclosure. The shapes of the accommodation groove 4, the release groove 5 and the connection groove 6 are not particularly limited in the technical solution of the present disclosure.

In some implementations, the diaphragm pattern 7 is connected to the support pattern 3, and the support pattern 3 and the diaphragm pattern 7 are made of a same material. In this case, the support pattern 3 and the diaphragm pattern 7 may be manufactured from a same material film, that is, the support pattern 3 and the diaphragm pattern 7 are formed into one piece.

In some implementations, the diaphragm pattern 7 extends to the connection groove 6, and an orthographic projection of the diaphragm pattern 7 on the base substrate 1 completely covers an orthographic projection of the connection groove 6 on the base substrate 1. That is, the diaphragm pattern 7 completely covers the connection groove 6 to seal the connection groove 6. It should be noted that although a part of the diaphragm pattern 7 in a region where the connection groove 6 is located may also have certain vibration, this part has a relatively small vibration amplitude due to a relatively small width of the connection groove 6, and thus has a substantially negligible vibration effect on a part of the diaphragm pattern 7 in the region where the accommodation groove 4 is located.

Figure 3:
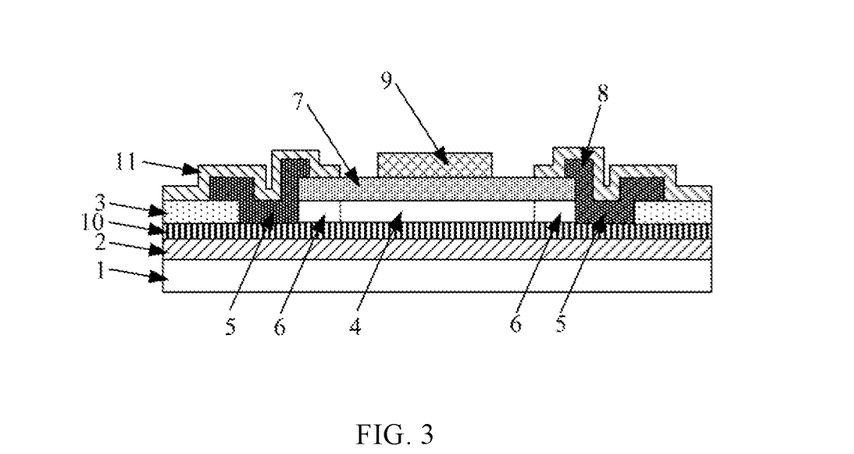
FIG. 3 is another schematic cross-sectional view taken along line A-A' of FIG. 1A.

FIG. 3 is another schematic cross-sectional view taken along line A-A' of FIG. 1A. As shown in FIG. 3, different from the acoustic transducer unit 13 of FIG. 2, the acoustic transducer unit of FIG. 3 further includes an etching barrier layer 10 and a passivation layer 11.

The etching barrier layer 10 is provided between the base substrate 1 and the support pattern 3, and is configured to protect the first electrode 2 from being etched by mistake in the process of removing the sacrificial pattern.

The passivation layer 11 is located on a side of the diaphragm pattern 7 away from the base substrate 1, and an orthographic projection of the passivation layer 11 on the base substrate 1 does not overlap the orthographic projection of the accommodation groove 4 on the base substrate 1. In other words, the passivation layer 11 has a hollow-out structure in the region where the accommodation groove 4 is located. With the passivation layer 11, the whole acoustic transducer unit can be protected; and meanwhile, since the passivation layer 11 has a hollow-out structure in the region where the accommodation groove 4 is located, it is possible to avoid affecting vibration performance of the part of the diaphragm pattern 7 in the region where the accommodation groove 4 is located.

In some implementations, the acoustic transducer unit may be provided with only the etching barrier layer 10 or only the passivation layer 11.

Figure 4A:
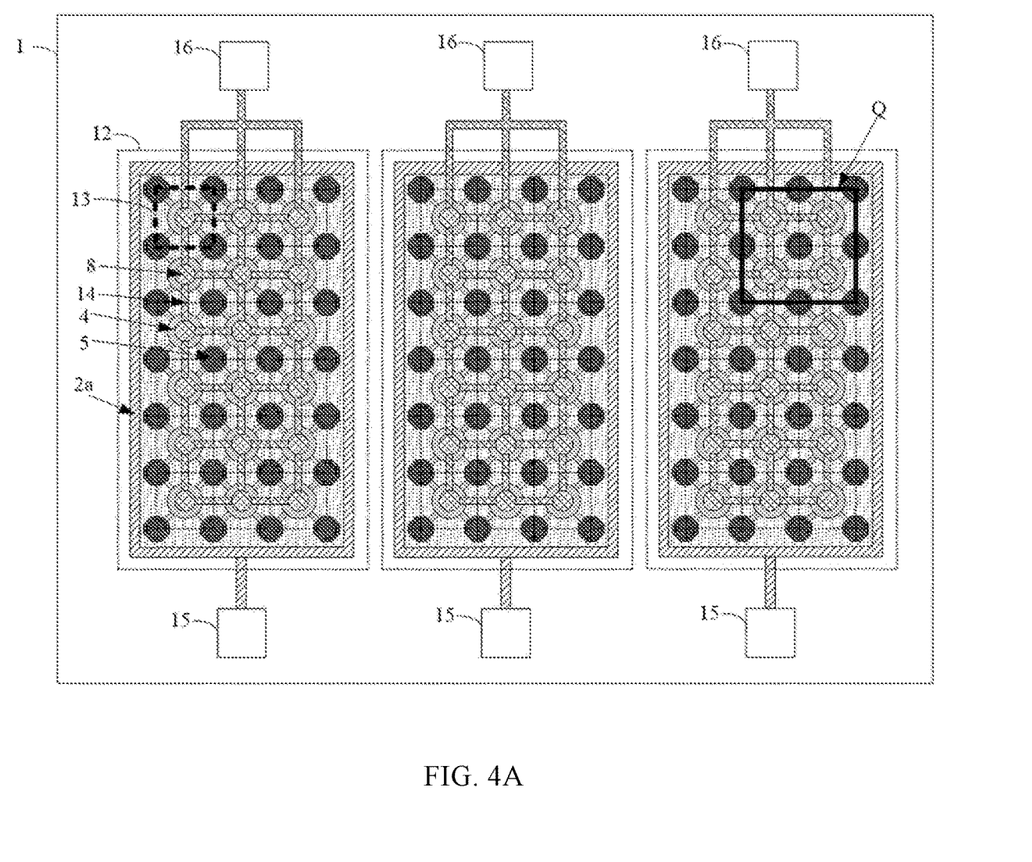
FIG. 4A is a top view of an acoustic transducer provided in an embodiment of the present disclosure.
Figure 4B:
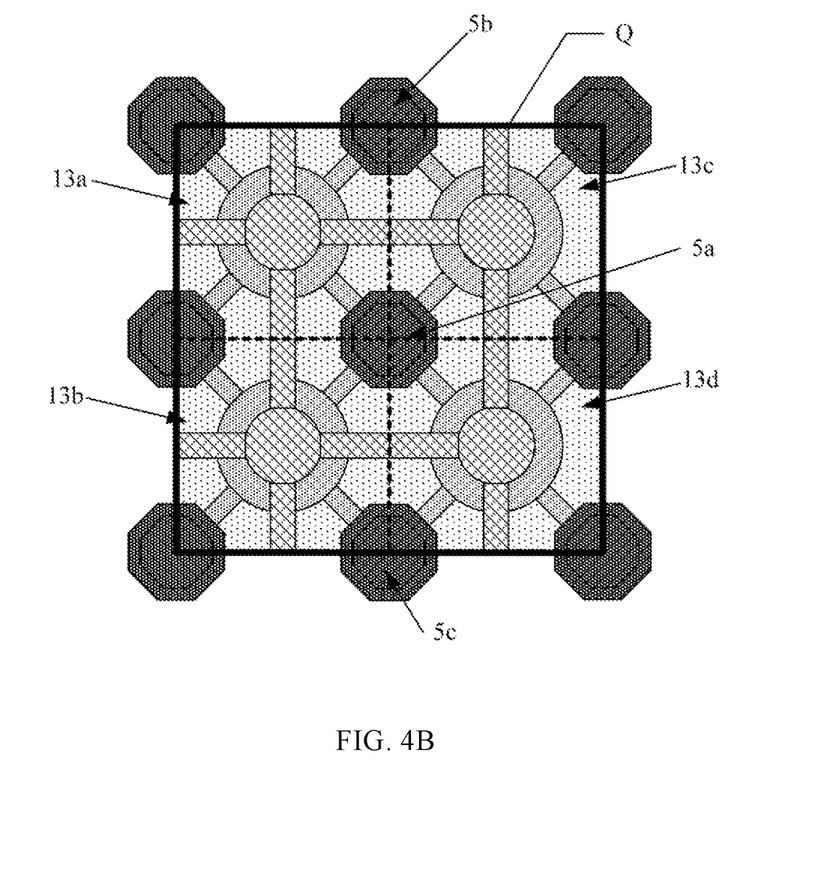
FIG. 4B is an enlarged view of a region Q in FIG. 4A.

FIG. 4A is a top view of an acoustic transducer provided in an embodiment of the present disclosure, and FIG. 4B is an enlarged view of a region Q in FIG. 4A. As shown in FIGS. 4A and 4B, the acoustic transducer includes: a base substrate 1 and a plurality of acoustic transducer elements 12 on the base substrate 1. Each acoustic transducer element 12 includes at least one acoustic transducer unit 13 adopting the acoustic transducer unit 13 as described in any of the above implementations. For specific description of the acoustic transducer unit 13, reference may be made to corresponding contents in the foregoing implementations, and details are not repeated herein.

It should be noted that in FIG. 4A, the acoustic transducer unit 13 adopts the acoustic transducer unit shown in FIG. 1B.

Each acoustic transducer element 12 is configured with two signal terminals, respectively referred to as a first electrical signal terminal 15 and a second electrical signal terminal 16. The first electrode 2 in the acoustic transducer unit 13 is electrically connected to the first electrical signal terminal 15 of the acoustic transducer element 12 to which the acoustic transducer unit 13 belongs, and a second electrode 9 in the acoustic transducer unit 13 is electrically connected to the second electrical signal terminal 16 of the acoustic transducer element 12 to which the acoustic transducer unit 13 belongs.

In some implementations, each acoustic transducer element 12 includes a plurality of acoustic transducer units 13. First electrodes 2 of the plurality of acoustic transducer units 13 in each acoustic transducer element 12 are electrically connected, and are electrically connected to the first electrical signal terminal 15 corresponding thereto. Second electrodes 9 of the plurality of acoustic transducer units 13 in each acoustic transducer element 12 are electrically connected, and are electrically connected to the second electrical signal terminal 16 corresponding thereto. In other words, the plurality of acoustic transducer units 13 in a same acoustic transducer element 12 are connected in parallel. First electrodes 2 of acoustic transducer units 13 in different acoustic transducer elements 12 may be disconnected (FIG. 4A), or may be electrically connected (for example, the first electrodes 2 of all acoustic transducer units 13 in the acoustic transducer share a same large-sized first electrode, and form parts of the large-sized electrode at different positions; in this case, only one first electrical signal terminal 15 needs to be configured for the large-sized first electrode, which is not shown in the figures), and second electrodes 9 of acoustic transducer units 13 in different acoustic transducer elements 12 are mutually electrically insulated. With the above arrangement, the plurality of acoustic transducer units 13 in the same acoustic transducer element 12 can be driven simultaneously.

It should be noted that FIG. 4A merely exemplarily illustrates a case where a total of three acoustic transducer elements 12 in one row and three columns, and each acoustic transducer element 12 includes a total of 18 acoustic transducer units 13 in six rows and three columns. It should be known by those of ordinary skill in the art that the case shown in FIG. 4A is merely exemplary and does not limit the technical solutions of the present disclosure. In practical applications, the number and arrangement of acoustic transducer elements 12 on an acoustic transducer substrate, and the number and arrangement of acoustic transducer units 13 included in each acoustic transducer element 12, can be designed according to requirements.

In some implementations, in a same acoustic transducer element 12, at least two acoustic transducer units 13 adjacent to each other are in communication with a same release groove through different connection grooves. In other words, the acoustic transducer units 13 adjacent to each other share a same release groove 5. The exemplary description is made below with reference to the accompanying drawings.

Taking the case shown in FIG. 4B as an example, in a region Q, there are four acoustic transducer units 13a, 13b, 13c and 13d arranged in an array of 2×2, and the four acoustic transducer units 13a, 13b, 13c and 13d are adjacent to each other in different directions and share a same release groove 5a. In addition, the acoustic transducer units 13a and 13c adjacent to each other share a same release groove 5b; and the acoustic transducer units 13b and 13d adjacent to each other share a same release groove 5c.

In the embodiments of the present disclosure, by sharing the release groove 5, a total number of release grooves 5 required to be configured in an acoustic transducer element 12 can be effectively reduced under the condition that the number of release grooves 5 required to be configured for each acoustic transducer unit 13 is fixed. In a case where a size of the acoustic transducer element 12 is fixed and a size of each release groove 5 is fixed, the less release grooves 5 are provided, the larger the region available for arranging the accommodation grooves 4. Accordingly, in a case where a size of each accommodation groove 4 is fixed, more accommodation grooves 4 can be arranged with the above arrangement; and in the case where the number of accommodation groove 4 is fixed, the size of each accommodation groove 4, and thus a size of the diaphragm pattern 7 corresponding thereto, can be increased accordingly.

For example, taking the case shown in FIG. 4A where each acoustic transducer element 12 includes 18 acoustic transducer units 13 as an example, provided that each acoustic transducer unit needs to be configured with four release grooves 5 to guarantee that the process step of removing the sacrificial pattern can be completed in a short time. If no shared release groove is used, each acoustic transducer element theoretically needs to be configured with 4×18=72 release grooves. Referring to FIG. 4A, by using the shared release grooves, only twenty eight release grooves 5 in seven rows and four columns are needed to be configured for each acoustic transducer element, which is far less than the seventy two release grooves in the case where no shared release groove is used.

In the embodiment of the present disclosure, by sharing the release groove 5, the region available for arranging the accommodation grooves 4 in the acoustic transducer element 12 is increased, which is beneficial to improving the accuracy of ultrasonic detection.

It should be noted that the specific case of sharing the release groove 5 among the acoustic transducer units 13 shown in FIGS. 4A and 4B is merely exemplary, and does not limit the technical solutions of the present disclosure.

In some implementations, the first electrodes 2 of the plurality of acoustic transducer units 13 in a same acoustic transducer element 12 are formed into one piece, that is, a plate electrode 2a.

In some implementations, the second electrodes 9 of the plurality of acoustic transducer units 13 in a same acoustic transducer element 12 are electrically connected through a signal trace 14, and the signal trace 14 and the second electrodes 9 are made of a same material. In this case, the signal trace 14 and the second electrodes 9 may be manufactured from a same material film.

It should be noted that, when the acoustic transducer unit includes the etching barrier layer, the etching barrier layer should cover at least a region where the first electrode is located to protect the first electrode 2 in the process of removing the sacrificial pattern. In some implementations, the etching barrier layer in the acoustic transducer is laid on a whole surface, and has hollow-out structures only in the regions where the first electrical signal terminals 15 are located, so that the first electrical signal terminals 15 is electrically connected to the first electrodes 2.

It should be noted that, when the acoustic transducer unit includes the passivation layer, it is enough to ensure that the passivation layer does not cover the region where the accommodation groove 4 is located. In some implementations, the passivation layer in the acoustic transducer is laid on a whole surface, and has hollow-out structures only in regions where the accommodation grooves 4 and the second electrical signal terminals 16 are located.

Figure 5:
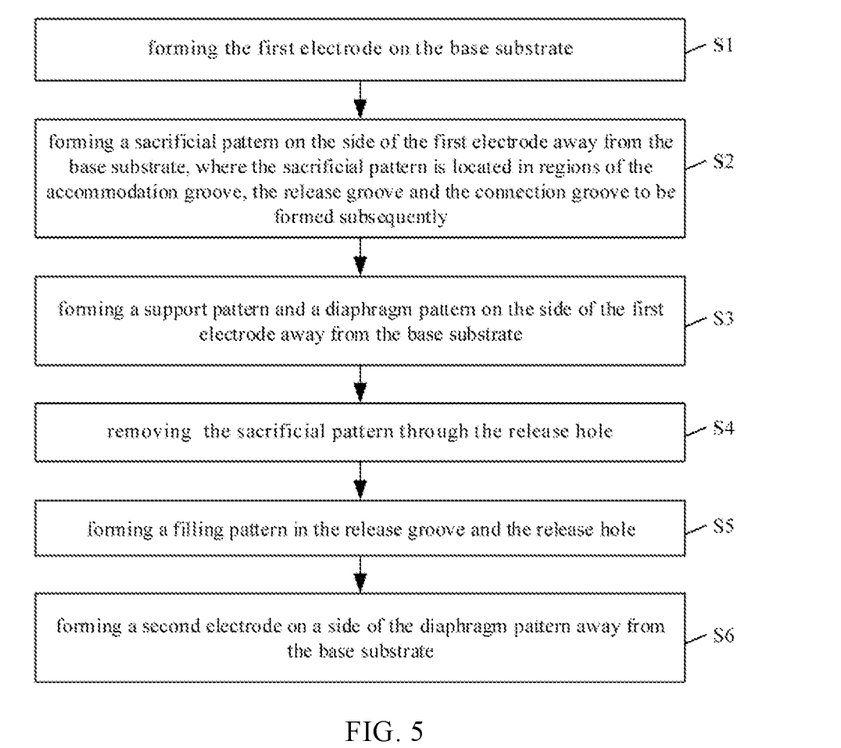
FIG. 5 is a flowchart of a method for manufacturing an acoustic transducer unit provided in an embodiment of the present disclosure.

FIG. 5 is a flowchart of a method for manufacturing an acoustic transducer unit provided in an embodiment of the present disclosure, FIGS. 6A to 6E are schematic top views of intermediate structures for manufacturing the acoustic transducer unit, and FIGS. 7A to 7E are schematic cross-sectional views taken along lines B-B' in FIGS. 6A to 6E. As shown in FIGS. 5 to 7F, the method is used for manufacturing the acoustic transducer unit, and includes the following steps S1 to S6.

At the step S1, a first electrode is formed on a base substrate.

In some implementations, the base substrate 1 is a glass substrate.

Figure 6A:
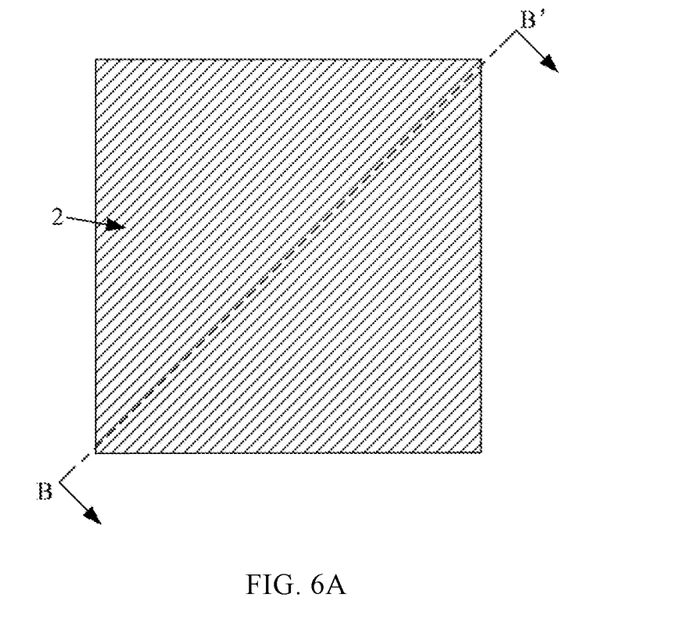
FIGS. 6A to 6E are schematic top views of intermediate structures for manufacturing the acoustic transducer unit.
Figure 7A:
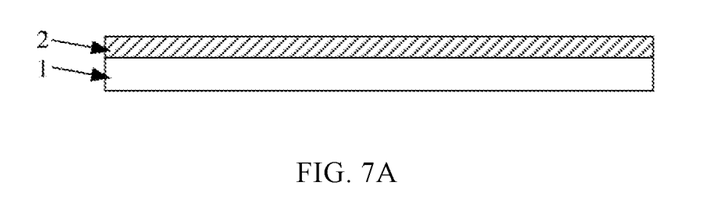
FIGS. 7A to 7E are schematic cross-sectional views taken along lines B-B' in FIGS. 6A to 6E.

Referring to FIGS. 6A and 7A, in some implementations, a first conductive material film is formed on the base substrate 1, i.e., the first electrode 2 is formed. The first conductive material film may have a single-layer structure (for example, a single-layer metal film of such as molybdenum or aluminum), or a multilayer stack structure (for example, a three-layer film stack structure of molybdenum-aluminum-molybdenum or a three-layer film stack structure of titanium-aluminum-titanium).

In the embodiments of the present disclosure, the first conductive material film is formed by a process including, but not limited to, sputter deposition or electron beam evaporation.

In some implementations, the first conductive material film is further subjected to a patterning process according to actual needs to obtain a pattern of the first electrode 2.

In the embodiments of the present disclosure, the patterning process generally includes photoresist coating, exposure, development, thin film etching, photoresist stripping, and other process steps.

At the step S2, a sacrificial pattern is formed on a side of the first electrode away from the base substrate, where the sacrificial pattern is located in regions of the accommodation groove, the release groove and the connection groove to be formed subsequently.

Figure 6B:
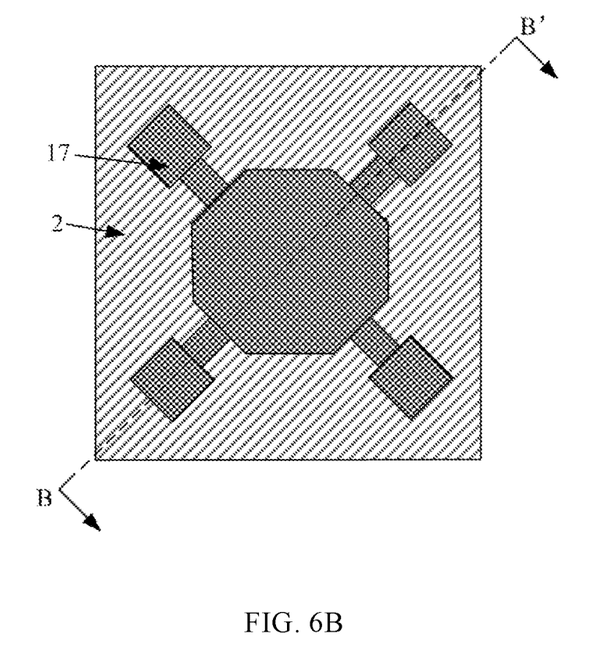
Figure 7B:
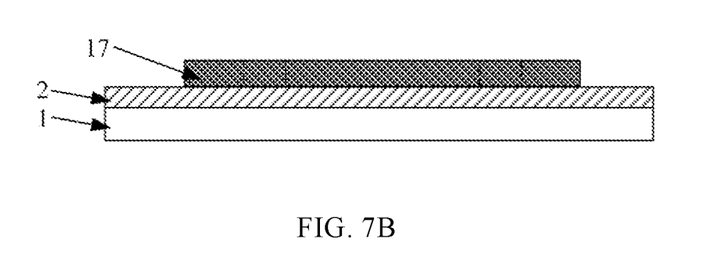

Referring to FIGS. 6B and 7B, in some implementations, a sacrificial material film is firstly formed on a surface of a substrate obtained in the step S1, and then patterned by a patterning process to form a sacrificial pattern 17 in the regions of the accommodation groove, the release groove and the connection groove to be formed subsequently.

In practical applications, a material of the sacrificial pattern 17 may be selected according to specific requirements, and it is required that the diaphragm pattern, the support pattern, the first electrode, and other manufactured structures are not damaged in the subsequent process of removing the sacrificial pattern. The material of the sacrificial layer may include a metal (e.g., aluminum, molybdenum, copper, etc.), a metal oxide (e.g., indium tin oxide, etc.), an insulating material (e.g., silicon dioxide, silicon nitride, photoresist, etc.), or the like.

At the step, a support pattern and a diaphragm pattern are formed on a side of the first electrode away from the base substrate.

Figure 6C:
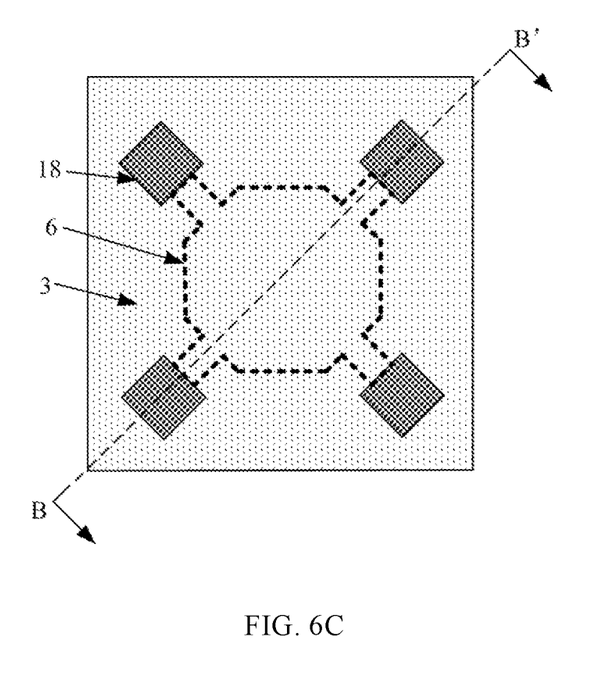
Figure 7C:
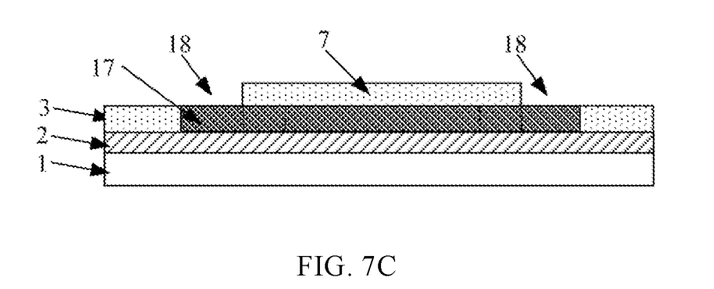

Referring to FIGS. 6C and 7C, in some implementations, a support vibration material film is firstly formed on a surface of the substrate obtained in the step S2, and covers side and top surfaces of the sacrificial pattern 17; and then, the support vibration material film is subjected to a patterning process to form a release hole 18 in a region of the support vibration material film where the release groove 5 is located. A part of the support vibration material film covering the top surface of the sacrificial pattern 17 is used as the diaphragm pattern 7, while the remainder is used as the support pattern 3. A part of the support pattern 3 located on the side surface of the sacrificial pattern 17 encloses into the accommodation groove, the release groove and the connection groove. The diaphragm pattern 7 is connected to the support pattern 3 and located on the side of the first electrode 2 away from the base substrate 1, and the release hole 18 is formed in the diaphragm pattern 7 in a region where the release groove is to be formed subsequently. In some implementations, the diaphragm pattern 7 completely covers the region where the accommodation groove is to be formed subsequently.

In some implementations, the support vibration material film may be made of an organic resin material or an inorganic material. When the support vibration material film is made of the organic resin material, a surface of the support vibration material film away from the base substrate 1 is planar (not shown). When the support vibration material film is made of the inorganic material (such as silicon nitride, silicon oxide, amorphous silicon, etc.), a part of the support vibration material film covering the side surface of the sacrificial pattern 17 has a step-shaped surface on a side thereof away from the base substrate 1.

In the case shown in FIG. 6C, the diaphragm pattern 7 completely covers the region where the release groove is to be formed subsequently.

It should be noted that, in some implementations, the support pattern 3 and the diaphragm pattern 7 may be manufactured separately. For example, the support pattern 3 is firstly formed on the side surface of the sacrificial pattern 17, and then the diaphragm pattern 7 is formed on the top surface of the sacrificial pattern 17, in which case, the support pattern 3 and the diaphragm pattern 7 may be made of a same material, or may be made of different materials.

At the step S4, the sacrificial pattern is removed through the release hole.

Figure 6D:
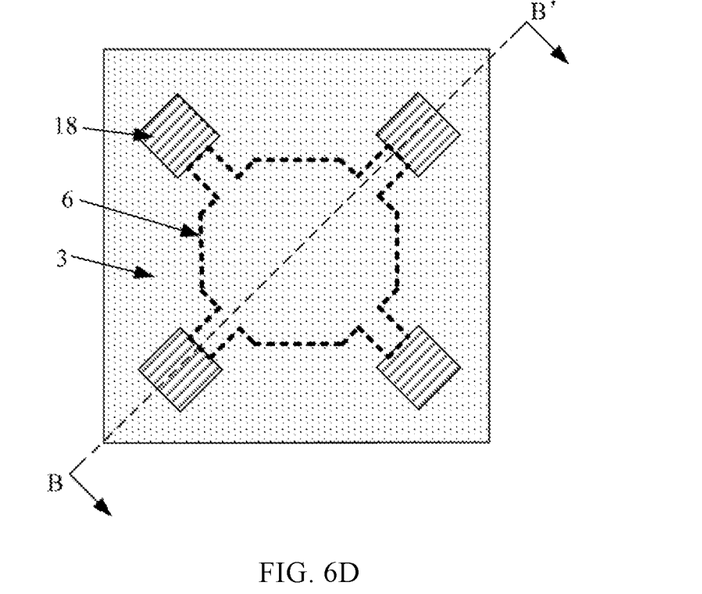
Figure 7D:
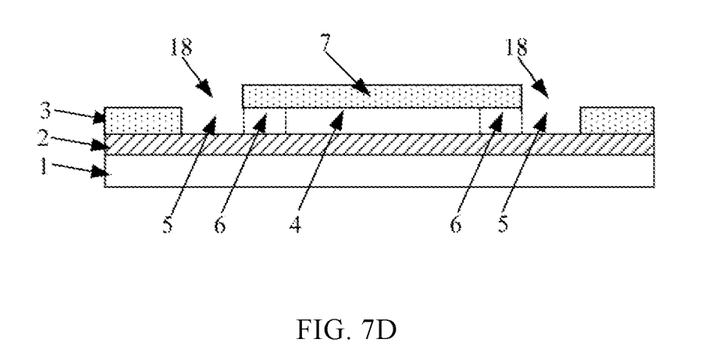

Referring to FIGS. 6D and 7D, in some implementations, the sacrificial pattern 17 may be removed through the release hole 18 by wet etching process. The etching solution used for removing the sacrificial pattern 17 depends on the material of the sacrificial pattern 17, and the only requirement is ensuring that the removing process of the sacrificial pattern 17 does not damage the manufactured structures such as the diaphragm pattern 7, the support pattern 3, the first electrode 2, or the like.

After the sacrificial pattern 17 is removed, the accommodation groove 4, the release groove 5 and the connection groove 6 enclosed by the support pattern 3 are exposed. An orthographic projection of the release groove 5 on the base substrate 1 is spaced apart from an orthographic projection of the accommodation groove 6 on the base substrate 1, and the connection groove 6 is located between the accommodation groove 4 and the release groove 5 to communicate the accommodation groove 4 with the release groove 5.

At the step S5, a filling pattern is formed in the release groove and the release hole.

Figure 6E:
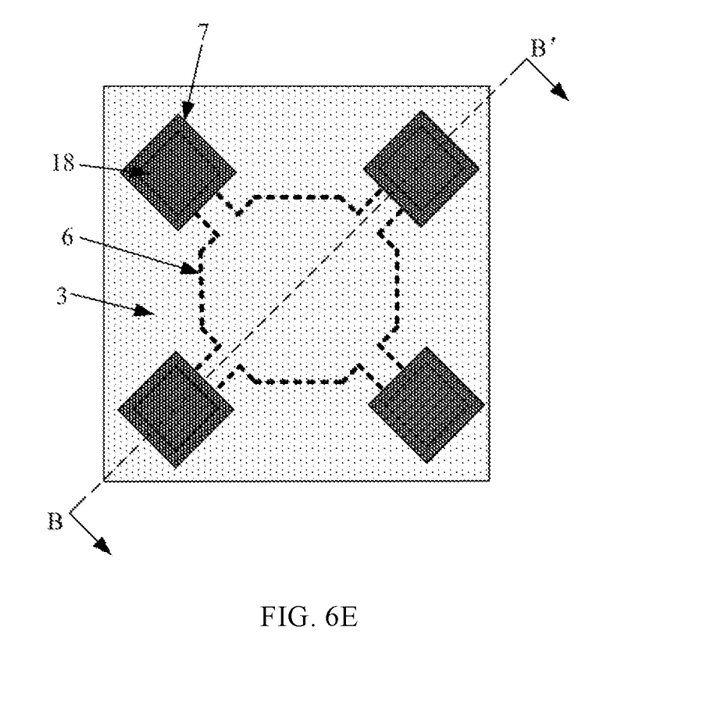
Figure 7E:
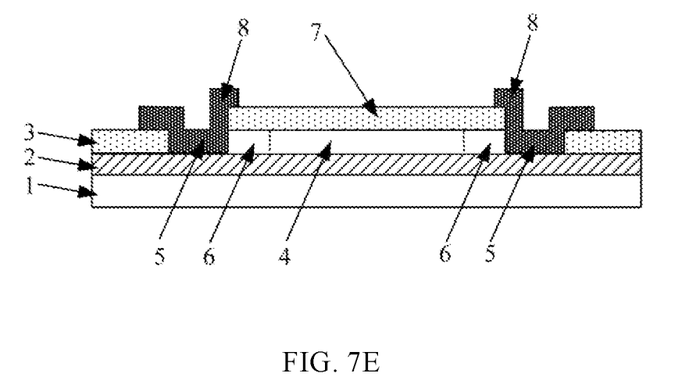

Referring to FIGS. 6E and 7E, in some implementations, a fill material film is firstly formed on a surface of the substrate obtained in the step S4, and then, the fill material film is subjected to a patterning process to obtain the filling pattern 8. The filling pattern 8 completely fills the release groove 5 and the release hole 18.

In some implementations, the fill material includes at least one of silicon oxide and silicon nitride.

At the step S6, a second electrode is formed on a side of the diaphragm pattern away from the base substrate.

Referring to FIGS. 1A and 2, in some implementations, a second conductive material film is firstly formed on a surface of the substrate obtained in the step S5, and then, the second conductive material film is subjected to a patterning process to obtain a pattern of the second electrode 9.

A material of the second electrode 9 depends on a packaging form of the acoustic transducer unit. In some implementations, the acoustic transducer unit is packaged by wire bonding, and the material of the second electrode 9 is a metal (e.g., aluminum). In some implementations, the acoustic transducer unit is packaged by bonding, and the material of the second electrode 9 is a conductive metal oxide (e.g., indium tin oxide).

Based on the above steps S1 to S6, the acoustic transducer unit shown in FIG. 2 can be manufactured.

It should be noted that in a case where the acoustic transducer unit adopts the arrangement of FIG. 3, a step S1a is further included between the step S1 and the step S2, and a step S7 is further included after the step S6.

At the step S1a, an etching barrier layer is formed.

A material of the etching barrier layer depends on materials of the sacrificial pattern and the first electrode, so as to ensure that the etching solution used for removing the sacrificial pattern will not damage the first electrode.

At the step S7, a passivation layer is formed on a side of the second electrode away from the base substrate.

The passivation layer has a hollow-out structure in the region where the accommodation groove is located.

Based on the above steps S1 to S7, the acoustic transducer unit shown in FIG. 3 can be manufactured.

In the acoustic transducer unit manufactured by the method in the embodiments of the present disclosure, since the release groove for removing the sacrificial pattern in the accommodation groove is disposed outside the region where the accommodation groove is located, the filling pattern filling the release groove is also located outside the accommodation groove, so that the filling pattern does not occupy space in the accommodation groove. As a result, the accommodation groove can be completely covered by the diaphragm pattern, the influence of the filling pattern on vibration of the diaphragm pattern is relative small, and thus the diaphragm pattern has a good vibration performance.

It could be understood that the above implementations are only exemplary implementations for describing the principle of the present disclosure, but the present disclosure is not limited thereto. Various modifications and improvements may be made by those of ordinary skill in the art without departing from the spirit and essence of the present disclosure, and these modifications and improvements are also regarded as falling within the protection scope of the present disclosure.

What is claimed is:

1. An acoustic transducer unit, comprising:
   a base substrate;
   a first electrode on a side of the base substrate;
   a support pattern on a side of the first electrode away from the base substrate, wherein the support pattern is enclosed into an accommodation groove, at least one release groove and at least one connection groove, an orthographic projection of the release groove on the base substrate is spaced apart from an orthographic projection of the accommodation groove on the base substrate, and the connection groove is located between the accommodation groove and the release groove to communicate the accommodation groove with the release groove;
   a diaphragm pattern on the side of the first electrode away from the base substrate and capable of vibrating in the accommodation groove;
   a filling pattern filled in the release groove; and
   a second electrode on a side of the diaphragm pattern away from the base substrate.

2. The acoustic transducer unit according to claim 1, wherein an orthographic projection of the diaphragm pattern on the base substrate completely covers the orthographic projection of the accommodation groove on the base substrate.

3. An acoustic transducer, comprising: a base and a plurality of acoustic transducer elements on the base, wherein each acoustic transducer element comprises at least one acoustic transducer unit according to claim 2.

4. The acoustic transducer unit according to claim 1, wherein one release groove corresponds to at least one connection groove.

5. An acoustic transducer, comprising: a base and a plurality of acoustic transducer elements on the base, wherein each acoustic transducer element comprises at least one acoustic transducer unit according to claim 4.

6. The acoustic transducer unit according to claim 4, wherein a plurality of release grooves are provided, and a plurality of connection grooves in one-to-one correspondence with the release grooves are provided.

7. The acoustic transducer unit according to claim 6, wherein the plurality of release grooves are uniformly distributed outside the accommodation groove.

8. An acoustic transducer, comprising: a base and a plurality of acoustic transducer elements on the base, wherein each acoustic transducer element comprises at least one acoustic transducer unit according to claim 6.

9. The acoustic transducer unit according to claim 1, wherein a cross section of the accommodation groove parallel to the base substrate has a quadrilateral shape, a hexagonal shape, an octagonal shape, a dodecagonal shape or a circular shape.

10. The acoustic transducer unit according to claim 1, wherein the diaphragm pattern extends to the connection groove, and an orthographic projection of the diaphragm pattern on the base substrate completely covers an orthographic projection of the connection groove on the base substrate.

11. The acoustic transducer unit according to claim 1, wherein an orthographic projection of the filling pattern on the base substrate completely covers the orthographic projection of the release groove on the base substrate; and
- an area of the orthographic projection of the filling pattern on the base substrate is greater than an area of the orthographic projection of the release groove on the base substrate.

12. The acoustic transducer unit according to claim 1, wherein the support pattern and the diaphragm pattern are made of a same material.

13. The acoustic transducer unit according to claim 1, further comprising:
- an etching barrier layer between the base substrate and the support pattern.

14. The acoustic transducer unit according to claim 1, further comprising:
- a passivation layer on a side of the diaphragm pattern away from the base substrate, wherein an orthographic projection of the passivation layer on the base substrate does not overlap the orthographic projection of the accommodation groove on the base substrate.

15. An acoustic transducer, comprising: a base and a plurality of acoustic transducer elements on the base, wherein each acoustic transducer element comprises at least one acoustic transducer unit according to claim 1.

16. The acoustic transducer according to claim 15, wherein each acoustic transducer element comprises a plurality of acoustic transducer units; and
- in a same acoustic transducer element, at least two acoustic transducer units adjacent to each other are in communication with a same release groove through different connection grooves.

17. The acoustic transducer according to claim 15, wherein each acoustic transducer element comprises a plurality of acoustic transducer units; and
- first electrodes of the plurality of acoustic transducer units in a same acoustic transducer element are electrically connected, and second electrodes of the plurality of acoustic transducer units in a same acoustic transducer element are electrically connected; and
- second electrodes of acoustic transducer units in different acoustic transducer elements are mutually electrically insulated.

18. The acoustic transducer according to claim 15, wherein first electrodes of the plurality of acoustic transducer units in a same acoustic transducer element form a plate electrode being a one-piece structure.

19. The acoustic transducer according to claim 15, wherein second electrodes of the plurality of acoustic transducer units in a same acoustic transducer element are electrically connected through a signal trace; and
- the signal trace and the second electrodes are made of a same material.

20. A method for manufacturing an acoustic transducer unit according to claim 1, comprising:
- forming the first electrode on the base substrate;
- forming a sacrificial pattern on the side of the first electrode away from the base substrate, wherein the sacrificial pattern is located in regions of the accommodation groove, the release groove and the connection groove to be formed subsequently;
- forming the support pattern and the diaphragm pattern on the side of the first electrode away from the base substrate, wherein a part of the support pattern on a side surface of the sacrificial pattern is enclosed into the accommodation groove, the release groove and the connection groove, the orthographic projection of the release groove on the base substrate is spaced apart from the orthographic projection of the accommodation groove on the base substrate, the diaphragm pattern is located on the side of the first electrode away from the base substrate, and a release hole is formed in the diaphragm pattern in a region where the release groove is located;
- removing the sacrificial pattern through the release hole;
- forming a filling pattern in the release groove and the release hole; and
- forming a second electrode on the side of the diaphragm pattern away from the base substrate.

* * * * *